US011531817B2

United States Patent
Aditya et al.

(10) Patent No.: US 11,531,817 B2
(45) Date of Patent: Dec. 20, 2022

(54) CREATING A KNOWLEDGE GRAPH BASED ON TEXT-BASED KNOWLEDGE CORPORA

(71) Applicant: Adobe Inc., San Jose, CA (US)

(72) Inventors: Somak Aditya, Bangalore (IN); Atanu Sinha, Bangalore (IN)

(73) Assignee: Adobe Inc., San Jose, CA (US)

( * ) Notice: Subject to any disclaimer, the term of this patent is extended or adjusted under 35 U.S.C. 154(b) by 518 days.

(21) Appl. No.: 16/656,163

(22) Filed: Oct. 17, 2019

(65) Prior Publication Data

US 2021/0117509 A1     Apr. 22, 2021

(51) Int. Cl.
*G06F 40/30* (2020.01)
*G06N 5/04* (2006.01)
*G06N 20/00* (2019.01)
*G06N 5/02* (2006.01)
*G06F 40/253* (2020.01)
*G06F 40/295* (2020.01)

(52) U.S. Cl.
CPC ............ *G06F 40/30* (2020.01); *G06F 40/253* (2020.01); *G06F 40/295* (2020.01); *G06N 5/02* (2013.01); *G06N 5/04* (2013.01); *G06N 20/00* (2019.01)

(58) Field of Classification Search
None
See application file for complete search history.

(56) References Cited

U.S. PATENT DOCUMENTS

2020/0257730 A1*  8/2020  Srinivas ................. G06N 5/022
2021/0026846 A1*  1/2021  Subramanya ........... G06F 16/36

OTHER PUBLICATIONS

Paulheim, Heiko, "Knowledge Graph Refinement: A Survey of Approaches and Evaluation Methods", Semantic Web 8(3), Dec. 2016, 23 pages.

Google, "Introducing the Knowledge Graph: Things, Not Strings", https://googleblog.blogspot.com/2012/05/introducing-knowledge-graph-things-not.html, May 16, 2012, accessed Oct. 17, 2019, 7 pages.

Speer, Robyn, et al, "Representing General Relational Knowledge in ConceptNet 5", Proceedings of the Eighth International Conference on Language Resources and Evaluation, (LREC-2012) May 2012, 8 pages.

Chen, Danqi, et al., "A fast and Accurate Dependency Parser Using Neural Networks", In Proceedings of the 2014 Conference on Empirical Methods in Natural Language Processing (EMNLP), Oct. 2014, Association for Computational Linguistics, 11 pages.

Lin Hongtao, et al., "Learning Dual Retrieval Module For Semi-Supervised Relation Extraction", arXiv: 190207814v2, Feb. 2019, In The Web Conference, May 2019, 11 pages.

* cited by examiner

*Primary Examiner* — Antim G Shah
(74) *Attorney, Agent, or Firm* — Kilpatrick Townsend & Stockton LLP (57) ABSTRACT

In some embodiments, a knowledge graph generation system extracts noun-phrases from sentences of a knowledge corpora and determines the relations between the noun-phrases based on a relation classifier that is configured to predict a relation between a pair of entities without restricting the entities to a set of named entities. The knowledge graph generation system further generates a sub-graph for each of the sentences based on the noun-phrases and the determined relations. Nodes or entities of the sub-graph represent the non-phrases in the sentence and edges represent the relations between the noun-phrases connected by the respective edges. The knowledge graph generation system merges the sub-graphs to generate the knowledge graph for the knowledge corpora.

18 Claims, 6 Drawing Sheets

CREATING A KNOWLEDGE GRAPH BASED ON TEXT-BASED KNOWLEDGE CORPORA

TECHNICAL FIELD

This disclosure relates generally to creating a knowledge graph based on knowledge corpora. More specifically, but not by way of limitation, this disclosure relates to creating a knowledge graph by analyzing relations between noun-phrases contained in general text-based knowledge corpora to create the knowledge graph.

BACKGROUND

Knowledge corpora for a specific domain, such as textbooks, notes, and academic papers, contain a large amount of information about this domain. For example, a textbook in the domain of computer networks typically contains various information about computer networks, such as the types of computer networks, the components in a computer network, the ways to construct a network, the benefits and drawbacks of using a computer network, and so on. Likewise, a textbook on marketing normally describes various aspects of marketing, such as market segmentation, market targeting, positioning, differentiation, etc. Some of the knowledge is factoid that can be used to concisely and definitely answer a knowledge query, such as the various types of a computer network, while others are non-factoid that can be used to answer open-ended questions, such as the knowledge for answer questions like "what are the effects of different ways of market segmentation"?

The vast amount of knowledge in these corpora can be helpful in making decisions such as the network deployment strategy or marketing strategy. However, automatically extracting knowledge from these corpora, especially for non-factoid knowledge, is challenging. This is because, for example, entities mentioned in the corpora, such as noun-phrases in the corpora, do not have a taxonomy and the typical corpora are not tightly worded leading to non-informative content. Existing methods are insufficient because knowledge graphs built by the existing methods are for factoid knowledge with a taxonomy. As a result, these knowledge graphs cannot be used to build knowledge graphs for non-factoid knowledge or general world knowledge that contains both factoid and non-factoid knowledge.

SUMMARY

Certain embodiments involve generating a knowledge graph by analyzing text-based knowledge corpora and determining relations between entities mentioned in the knowledge corpora. In one example, a knowledge graph generation system extracts a set of sentences from a text-based knowledge corpus and determines relations between noun-phrases for each of the sentences based on dependency paths of the sentence and a relation classifier configured to predict a relation between a pair of noun-phrases. The knowledge graph generation system further generates a sub-graph for each of the sentences based on the relations between the noun-phrases in each sentence. The sub-graph includes entities representing the noun-phrases in the sentence and edges connecting the entities. Each edge represents the relation between two noun-phrases connected by the edge. The knowledge graph generation system generates a knowledge graph by merging the sub-graphs for the set of sentences. The knowledge graph generation system or another system identifies one or more entities or one or more relations from the knowledge graph based on a knowledge request and transmits the one or more entities or one or more relations to an online platform. The one or more entities or one or more relations are usable for modifying the online platform.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Certain embodiments involve generating a knowledge graph by analyzing text-based knowledge corpora and determining relations between entities mentioned in the knowledge corpora. For instance, a knowledge graph generation system accesses a text-based knowledge corpus related to a topic, such as the topic of market segmentation. The text-based knowledge corpus can include, for example, a textbook or a book chapter covering the topic, notes on the topic, or academic papers discussing the topic. The knowledge graph generation system extracts sentences from the text-based knowledge corpus and determines noun-phrases from each of the sentences. The knowledge graph generation system further generates a sub-graph for one sentence or multiple sentences based on relations predicted for various pairs of noun-phrases in the sentence or sentences. By merging these sub-graphs, the knowledge graph generation system generates a knowledge graph for the knowledge corpus which can be queried to service requests for knowledge. The returned knowledge may be used by a computing system to perform various actions, such as modifying a configuration or a user interface of an online platform.

The following non-limiting example is provided to introduce certain embodiments. In this example, a knowledge graph generation system communicates with a data store where text-based knowledge corpora, such as textbooks, notes, journal articles, technical or business reports, etc. are stored. The knowledge graph generation system accesses a text-based knowledge corpus that is related to a topic and extracts the sentences from the knowledge corpus. For example, the text-based knowledge corpus related to the topic of market segmentation might include a book chapter dedicated to the market segmentation. The knowledge graph generation system extracts the sentences from the knowledge corpus and generates a sub-graph for each of these sentences.

In this example, the knowledge graph generation system identifies noun-phrases in a sentence and further determines the relations between pairs of noun-phrases in the sentence. For example, in a sentence such as "market segmentation divides markets into smaller segments of buyers," the noun-phrases include "market," "market segmentation," and "segments." The relation between "market" and "segments" can be determined as "include" or "contain," and the relation between "market segmentation" and "segments" can be determined as "generate." To determine these relations, the knowledge graph generation system utilizes a relation classifier to predict the relation between each pair of noun-phrases. The relation classifier is pre-trained to receive an input containing two noun-phrases and the associated sentence and to output the relation between these two noun-phrases. Training of the relation classifier can be performed through semi-supervised training where the training data includes pairs of entities labeled with corresponding relations and pairs of entities without labeled relations.

Continuing with the above example, the knowledge graph generation system can further utilize dependency paths of the noun-phrases to facilitate the relation determination process. The dependency paths of the noun-phrases are determined based on the grammatical structure of the sentence. For instance, a dependency path exists between the subject of a sentence and an object of the sentence because they are connected by a verb. In some implementations, the dependency paths are used to trim or remove relations that contradict with the dependency paths. By using the extracted noun-phrases and their relations, the knowledge graph generation system creates a sub-graph for each sentence. Nodes of a sub-graph represent the noun-phrases (i.e., entities) in the sentence, and edges of the sub-graph represent the relations between the nodes or entities. The knowledge graph generation system further merges the sub-graphs by combining common nodes in the sub-graphs and generates a knowledge graph for the topic. The knowledge graph generation system can store the knowledge graph in a data store to allow other systems to access the knowledge graph.

In some examples, the knowledge graph generation system or another system having access to the knowledge graph can be configured to receive a request to query the knowledge graph. For example, the request may include a question seeking for answers to the question. The question can be parsed into a subject entity and a relation. The request is thus a query of the knowledge graph for object entities that are related to the subject entity through the specified relation. Depending on the topic covered by the knowledge graph, the object entities may have different meanings. In the example where a knowledge graph covers a marketing topic, the object entities might represent the possible market effects if an action represented by the subject entity is taken and the specified relation indicates such as a cause-effect relation. The knowledge graph generation system or another system can be configured to traverse or otherwise query the knowledge graph to determine the object entities that satisfy the request. The determined object entities are returned to the requesting computing system, which can rely on the received knowledge to take actions such as modifying an online platform to achieve the effect specified in the object entities.

As described herein, certain embodiments provide improvements to knowledge graph creation by generating a knowledge graph based on general knowledge corpora that include non-factoid knowledge. These improvements include implementing or applying rules of a particular type that improve existing knowledge graph generation processes. Specifically, the rules include extracting noun-phrases from each sentence related to a topic to identify entities in the knowledge graph and determining the relations between pairs of noun-phrases using a pre-trained relation classifier that is trained without being restricted to a set of named entities that are factoid knowledge. The rules further include removing relations between noun-phrases that contradict with the dependency paths determined based on the grammatical structure of each sentence. Additional rules include utilizing the dependency paths of the sentences (i.e., the inherent grammatical structures of the sentences) to determine the order for processing the sentences so that sentences containing important entities are processed first. These rules allow a computing system to produce an accurate knowledge graph for knowledge corpora that contain general world knowledge including non-factoid knowledge.

The knowledge graphs can be used to capture knowledge in a variety of areas especially the areas where the decision-making process highly depends on human experts because the knowledge cannot be captured by data, reporting tools or existing models. For example, when making marketing decisions, decision-makers typically bring their own knowledge or expertise or bring other marketing analysts or experts. By creating a knowledge graph as disclosed herein, the domain knowledge is transformed into a computer understandable format and can be obtained without relying on human experts, thereby improving the capability of a computer in processing human-language-based knowledge corpora. Further, the knowledge graph can be queried to provide knowledge to various systems such as an online platform to facilitate the evaluation and modification of the systems, such as modifying configurations or user interfaces of an online platform to improve the efficiency and effectiveness of the system.

As used herein, the term "knowledge corpora" is used to refer to a collection of text-based written materials concerning one or more topics that provide a reliable source of knowledge about these topics. Examples of the knowledge corpora include, but not limited to, textbooks covering certain topics, notes that include a comprehensive compilation of content for a topic, and webpages, articles or papers that systematically describe certain topics.

As used herein, the term "knowledge graph" is used to refer to an interlinking graph of entities and relations generated from knowledge corpora. For example, a knowledge graph includes nodes representing entities involved in the knowledge corpora and edges representing relations between these entities. The relations are determined based on the content of the knowledge corpora. A knowledge graph for a certain topic is generated from a knowledge corpus covering the topic. For example, a knowledge graph for market targeting can be generated from a chapter of a marketing textbook that discusses the topic of market targeting.

As used herein, the term "sub-graph" is used to refer to an interlinking graph of entities and relations generated from a subset of the knowledge corpora. For example, a sub-graph may be generated for one sentence contained in the knowledge corpora. The sub-graph contains the entities mentioned in the sentence and relations between these entities determined according to the content of the sentence.

As used herein, the term "dependency path" is used to refer to a relation between two entities mentioned in a sentence of the knowledge corpora based on the grammatical structure of the sentence. For example, in the sentence "the girl is playing with a dog," there is a dependency path between "the girl" and "the dog," because "the girl" is related to "playing" which is related to "the dog."

As used herein, the term "online platform" is used to refer to software program, which when executed, provides an interactive computing environment having various interface elements with which user devices interact to achieve various goals. In this disclosure, the term "online platform" may also be used to refer to the interactive computing environment that it provides. For example, clicking or otherwise interacting with one or more interface elements during a session causes the online platform to manipulate electronic content, perform transactions, or otherwise interact with electronic content that is accessible via the online platform.

Figure 1:
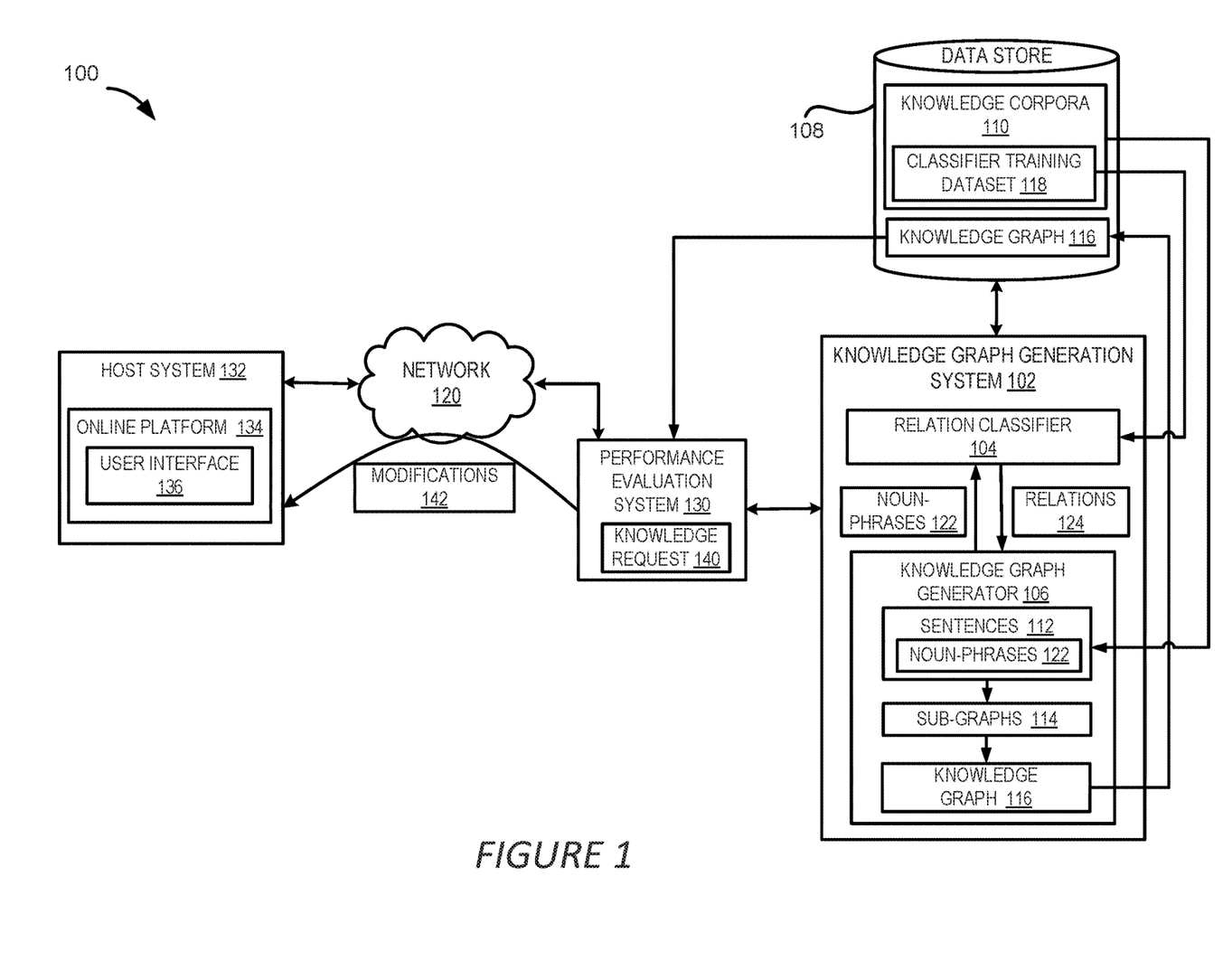
FIG. 1 depicts an example of a computing environment in which a knowledge graph generation system can be used to create a knowledge graph based on knowledge corpora and to provide a query service by querying the knowledge graph, according to certain aspects of the present disclosure.

Referring now to the drawings, FIG. 1 is an example of a computing environment 100 in which a knowledge graph generation system 102 can be used to analyze knowledge corpora 110 to generate a knowledge graph 116. In various embodiments, the computing environment 100 includes the knowledge graph generation system 102, a data store 108 configured for storing the knowledge corpora 110 and the generated knowledge graph 116, and a host system 132 hosting an online platform 134 that can utilize the knowledge graph 116 to improve its performance.

The knowledge corpora 110 include a collection of text-based written materials concerning one or more topics that provide a reliable source of knowledge about these topics. Examples of the knowledge corpora include, but are not limited to, textbooks, notes, webpages, articles, papers, or any combination thereof. The knowledge corpora 110 may be collected from one or more reliable third-party resources (not shown in FIG. 1) online or offline, such as libraries, informational organizations, university databases, and so on.

To generate a knowledge graph 116, the knowledge graph generation system 102 employs a knowledge graph generator 106 to analyze the knowledge corpora 110. The knowledge graph generation system 102 communicates with the data store 108 to access the knowledge corpora 110. In some examples, the knowledge graph 116 is generated for a specific topic. In those examples, the knowledge graph generation system 102 accesses the portion of the knowledge corpora 110 that covers the specific topic, such as a book chapter or a section dedicated to that topic. In examples where the knowledge corpora 110 includes books, the knowledge graph generation system 102 can be configured to determine the structure of the book, such as through the table of contents of the book, to identify the chapters or sections covering the specific topic. The portion of the knowledge corpora 110 that covers the specific topic can be retrieved by the knowledge graph generation system 102 to generate the knowledge graph 116.

The knowledge graph generator 106 parses the retrieved portion of the knowledge corpora 110 to extract sentences 112 contained therein. For each of these sentences 112, the knowledge graph generator 106 builds a sub-graph 114, from which the knowledge graph 116 is to be built. To build a sub-graph 114 for a sentence 112, the knowledge graph generator 106 extracts phrases that contain nouns, also referred to herein as "noun-phrases" 122, from this sentence 112. These noun-phrases 122 can be extracted using any syntactic parser known in the art. The knowledge graph generator 106 determines the relations between pairs of the noun-phrases 122 in the sentence. In one example, the knowledge graph generator 106 determines the relation between a pair of noun-phrases 122 using a relation classifier 104. The relation classifier 104 is pre-trained to output a relation 124 between a pair of input noun-phrases 122 based on the sentence 112 containing the noun-phrases 122.

In one example, the relation classifier 104 is trained through semi-supervised training based on classifier training dataset 118. The training dataset 118 includes a set of labeled training data and a set of unlabeled training data. The labeled training data include pairs of noun-phrases labeled with their relations along with their associated sentences. The unlabeled training data only include the pairs of the noun-phrases and the associated sentences, and the relations between the pairs of noun-phrases remain unknown. In some examples, the classifier training dataset 118 is generated from the knowledge corpora 110. The labeled training data is generated through experts with domain knowledge manually labeling the relations between the pairs of noun-phrases. In other examples, the labeled training data can be generated using another classifier with higher accuracy but a higher computational complexity. In either case, the labeled training data provides accurate information about the relations between the pairs of noun-phrases in the data set so that this information can be relied on to determine the relations for other pairs of noun-phrases.

Based on the labeled training data and the unlabeled training data, the knowledge graph generation system 102 employs semi-supervised training process to propagate the information contained in the labeled training data to the unlabeled training data and eventually enables the relation classifier 104 to predict the relations between a given pair of noun-phrases in a sentence. Additional details regarding training the relation classifier 104 are provided below with regard to FIG. 4.

Based on the relations 124 predicted for the noun-phrases 122 in a sentence 112, the knowledge graph generator 106 builds a sub-graph 114 by representing the noun-phrases as entities using nodes of the sub-graph 114 and representing the relations between the pairs of the noun-phrases using edges of the sub-graph 114. The knowledge graph generator 106 repeats the above process for each of the sentences 112 contained in the knowledge corpora 110. Based on the sub-graphs 114, the knowledge graph generator 106 creates the knowledge graph 116 by merging nodes that are common to multiple of the sub-graphs 114. An example of two sub-graphs 114 and the merged knowledge graph 116 is shown in FIGS. 3A-3C. Additional details regarding generating the sub-graphs 114 and the knowledge graph 116 are provided below with regard to FIGS. 2-6. The generated knowledge graph 116 can be stored in the data store 108 or other storage devices.

The generated knowledge graph 116 can be utilized by a computing system to retrieve domain knowledge without involving human expertise. FIG. 1 illustrates an example of a performance evaluation system 130 that can be used to analyze the performance of an online platform 134 hosted by a host system 132 and, in some cases, facilitate modifications to the online platform 134. The online platform 134 may be accessible and interacted with by multiple user devices, such as through a user interface 136. The interactions can include users clicking on interface elements in a user interface 136, users initiating transactions through the user interface 136, such as a purchase transaction or a registration transaction, or users creating contents on the user interface 136, such as posting a comment, an image, a blog, or any other content.

The interactions between the users or their associated user devices and the online platform 134 can be saved by the host system 132 as performance data. The host system 132 or another computing system, such as the performance evaluation system 130, can analyze the performance data to determine the performance of the online platform 134, such as the number of clicks on an interface element for a given period of time (e.g., in a minute, an hour, or a day), the number of transactions conducted within a given period of time, the number of new content items created by the users on the online platform 134, or other kinds of metrics. Based on the analysis, the host system 132 can send or the performance evaluation system 130 can generate a knowledge request 140, for example, to query the knowledge graph 116 for knowledge, such as the effects of certain modifications to the online platform 134 or actions to be taken in order to achieve certain effects.

For example, the knowledge request 140 may specify an entity, also referred to as "subject entity," and a relation associated with the subject entity. The performance evaluation system 130 queries the knowledge graph 116 to determine the entities that are related to the subject entity through the specified relation, also referred to herein as "object entities." In another example, the knowledge graph generation system 102 may also be configured to query the knowledge graph 116 and the performance evaluation system 130 may communicate with the knowledge graph generation system 102 to perform the knowledge query.

For instance, the subject entity can represent a modification to the online platform 134, such as a change to the user interface to present different content for users in different geographical locations (i.e., geographical segmentation). The relation in the knowledge request 140 can include "lead to" or "pave the way for." The object entities returned by querying the knowledge graph 116 thus represent the effects of such a modification, which may include "increased number of customers," "high maintenance cost," and so on. Based on the object entities, the performance evaluation system 130 can determine the modifications 142 that can improve the overall performance of the online platform 134. The performance evaluation system 130 can further transmit the modifications 142 to the host system 132 to have the modifications 142 implemented on the online platform 134.

One or more computing devices are used to implement the knowledge graph generation system 102, the performance evaluation system 130, and the host system 132. For instance, the knowledge graph generation system 102, the host system 132, the performance evaluation system 130, or all of them could include a single computing device, a group of servers or other computing devices arranged in a distributed computing architecture, etc.

The online platform 134 can be any suitable online service for interactions with user devices. Examples of an online platform include a content creation service, an electronic service for entering into transactions (e.g., searching for and purchasing products for sale, or registering for certain services), a query system, etc. In some embodiments, the host system 132 includes third-party systems that operate independently of the performance evaluation system 130 and the knowledge graph generation system 102 (e.g., being operated by different entities, accessible via different network domains, etc.). The host system 132 may communicate with the performance evaluation system 130 or the knowledge graph generation system 102 through a network 120. The network 120 may be a LAN, a WAN, the Internet, or any other networking topology that connects the host system 132 to the performance evaluation system 130 or the knowledge graph generation system 102.

Similarly, the performance evaluation system 130 may also include third-party systems that operate independently of the knowledge graph generation system 102 and connect to the knowledge graph generation system 102 through a network, such as the network 120. In additional or alternative examples, the host system 132 includes a knowledge graph generation system 102 as part of a common computing system. The user device (not shown in FIG. 1) may be any device that is capable of accessing an online service. For non-limiting examples, a user device may be a smartphone, smart wearable, laptop computer, desktop computer, or other types of user device.

Figure 2:
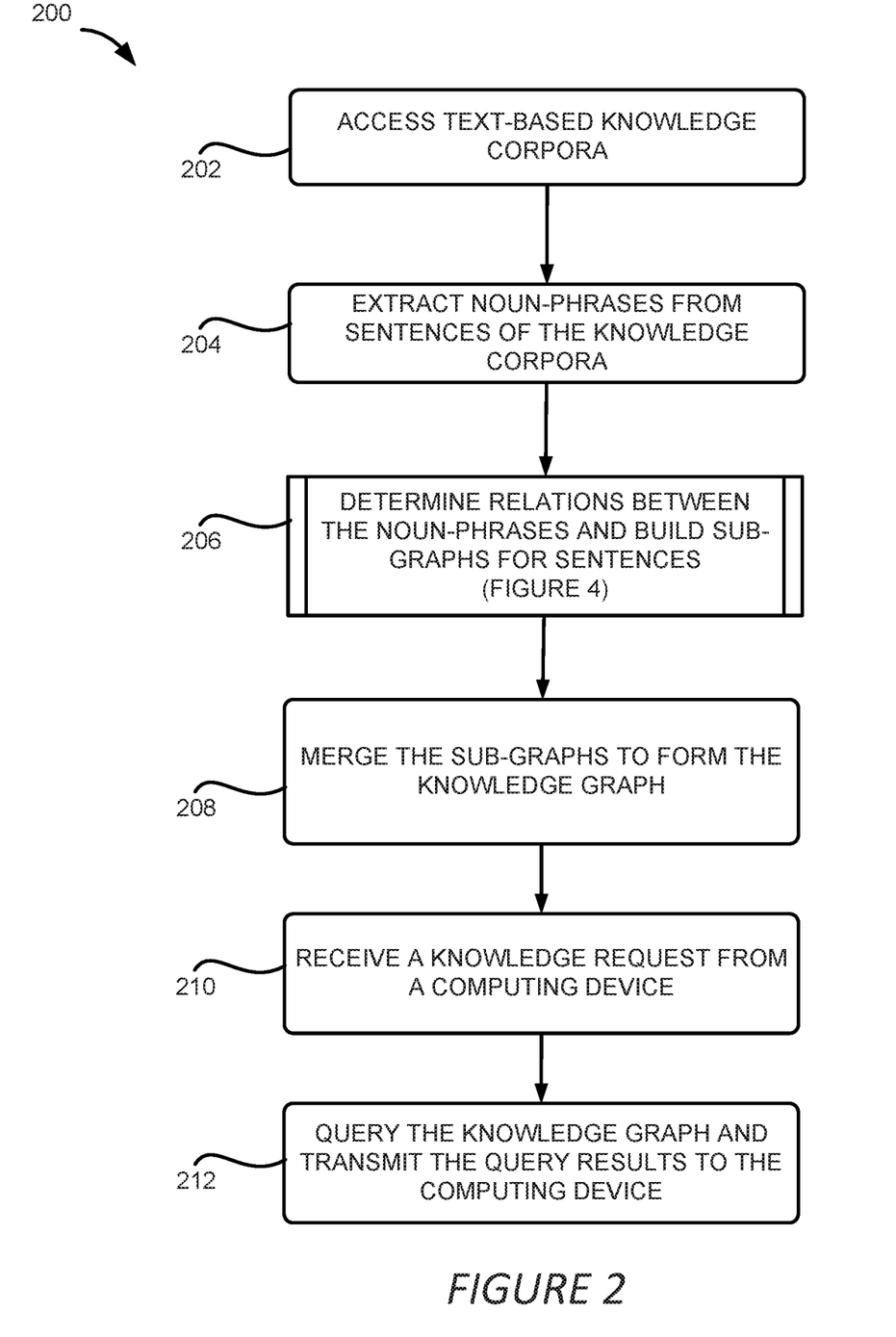
FIG. 2 depicts an example of a process for generating a knowledge graph based on a text-based knowledge corpus and utilizing the knowledge graph to satisfy knowledge queries, according to certain aspects of the present disclosure.
Figure 3A:
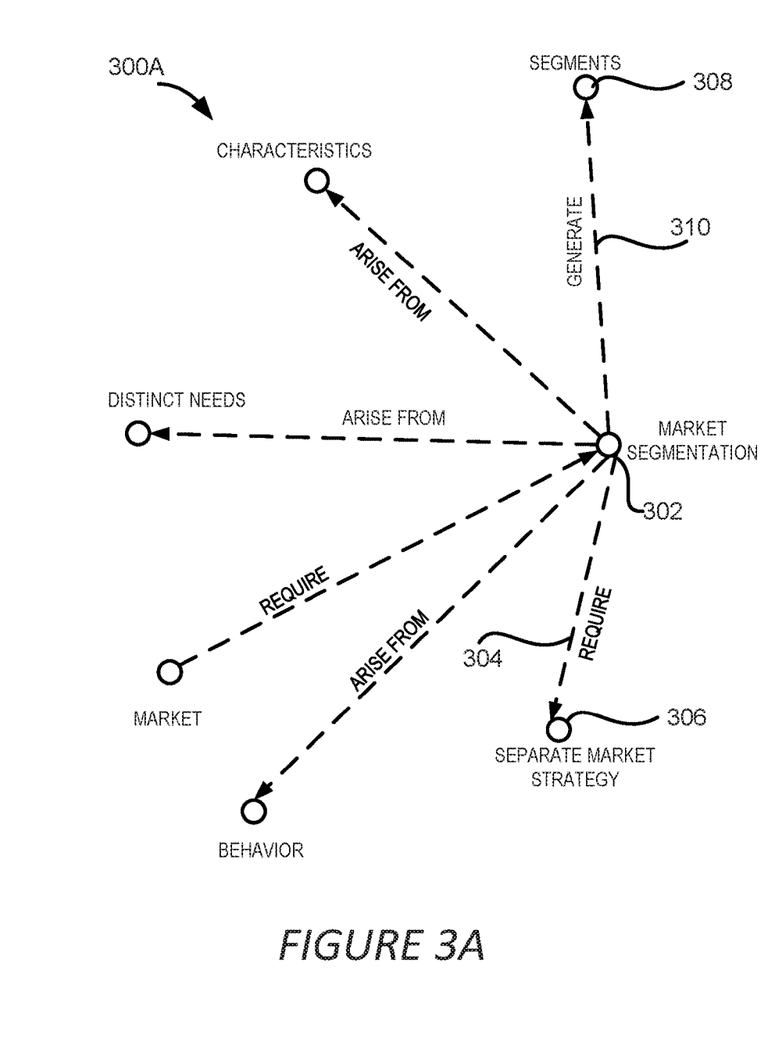
FIG. 3A depicts an example of a sub-graph created based on a sentence of a text-based knowledge corpus, according to certain aspects of the present disclosure.
Figure 3B:
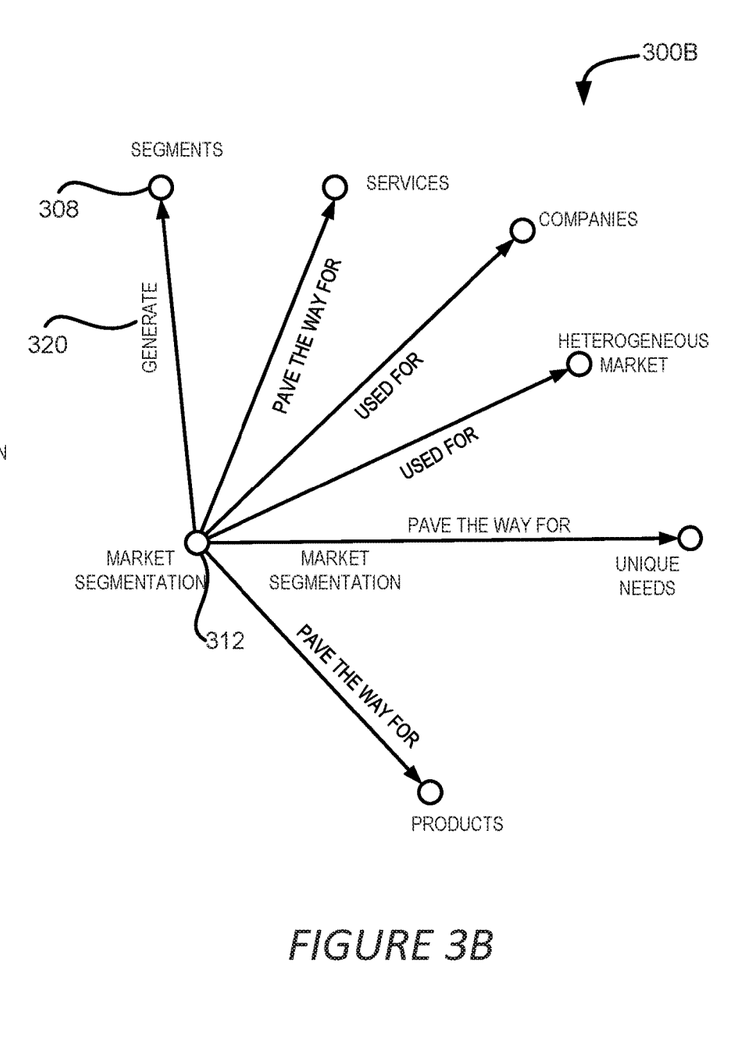
FIG. 3B depicts another example of a sub-graph created based on another sentence of a text-based knowledge corpus, according to certain aspects of the present disclosure.
Figure 3C:
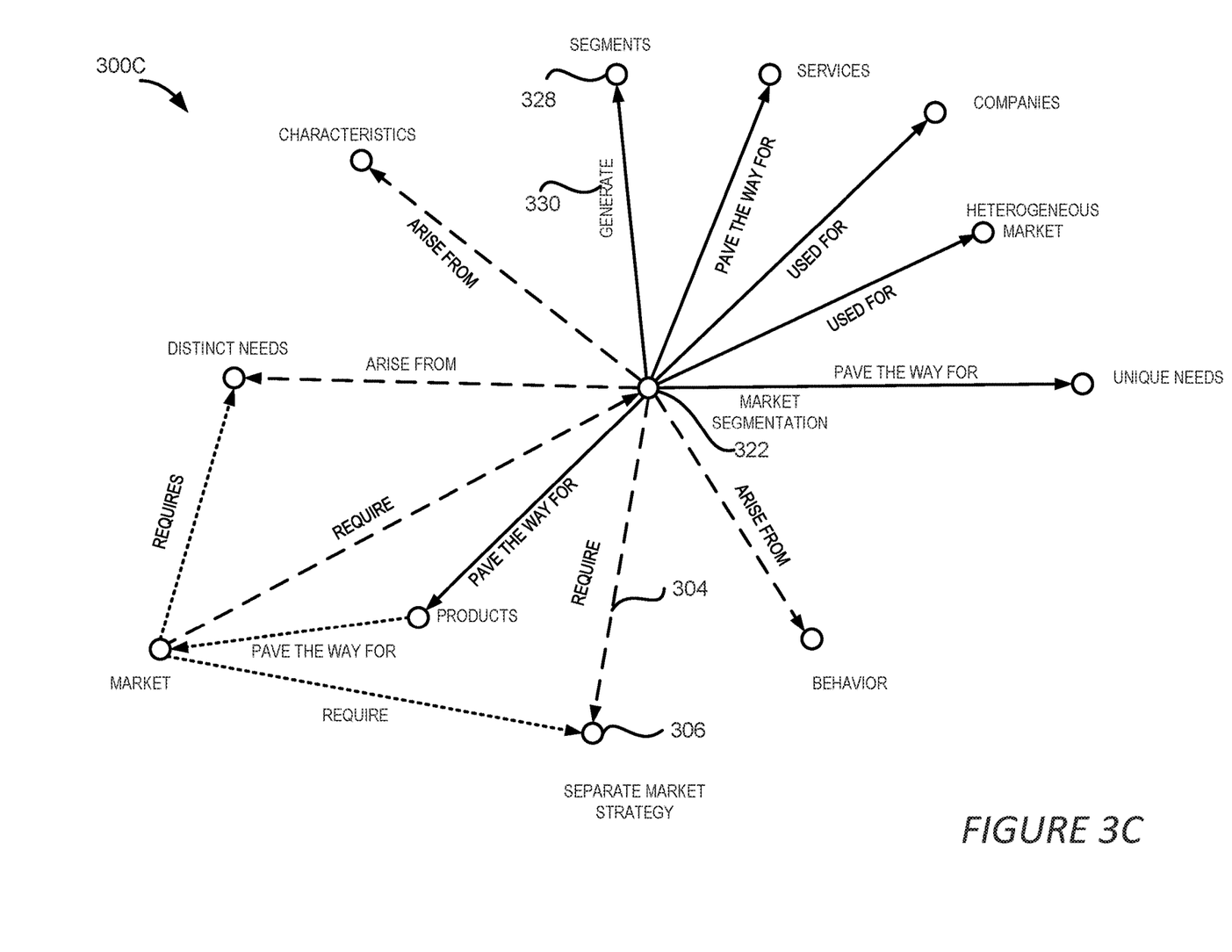
FIG. 3C depicts an example of a knowledge graph created by merging sub-graphs shown in FIGS. 3A and 3B and other sub-graphs created based on sentences of the text-based knowledge corpus, according to certain aspects of the present disclosure.

FIG. 2 depicts an example of a process 200 for generating a knowledge graph 116 based on a text-based knowledge corpus 110 and for facilitating modifications of an online platform 134 by querying the knowledge graph 116, according to certain aspects of the present disclosure. One or more computing devices (e.g., the computing environment 100) implement operations depicted in FIG. 2 by executing suitable program code. For illustrative purposes, the process 200 is described with reference to certain examples depicted in the figures. Other implementations, however, are possible.

At block 202, the process 200 involves accessing text-based knowledge corpora 110. As discussed above with respect to FIG. 1, the knowledge corpora 110 include a collection of text-based written materials concerning one or more topics that provide a reliable source of knowledge about these topics. In some examples, the knowledge graph generation system 102 is configured to create a knowledge graph 116 for a specific topic. In these examples, the knowledge graph generation system 102 accesses the portion of the knowledge corpora 110 that are related to this specific topic, such as a book chapter or a section devoted to the discussion of the topic.

At block 204, the process 200 involves extracting sentences from the knowledge corpora 110 and further extracting noun-phrases from these sentences. For example, if the knowledge corpora 110 accessed at block 202 is a book chapter covering the topic "market segmentation," the knowledge graph generation system 102 extracts the sentences from this book chapter. For each of the sentences, the knowledge graph generation system 102 extracts noun-phrases contained in a sentence. Extracting noun-phrases may be performed using any syntactic parser for natural language known in the art. For a topic related to "market segmentation," the noun-phrases extracted from the sentences in the knowledge corpora 110 may include "market segmentation," "geographic segmentation," "demographic segmentation," "market," "products," "services," "segments," and the like.

At block 206, the process 200 involves determining relations between each pair of noun-phrases in one sentence or multiple sentences of the knowledge corpora 110 and building a sub-graph for the sentences. In one example, one sub-graph is built for each sentence. In this example, the knowledge graph generation system 102 determines a relation for each pair of noun-phrase in a sentence, for example, using a pre-trained relation classifier. The relation classifier may be configured to receive a pair of noun-phrases and the sentence containing the pair as an input and to output a relation between the pair of noun-phrases. The relation classifier can also be configured to provide an indication if there is no relation between a pair of noun-phrases. Additional details regarding the relation classifier and determining the relations between pairs of noun-phrases are described herein with respect to FIG. 4.

Based on the relations between pairs of noun-phrases, the knowledge graph generation system 102 creates a sub-graph for each sentence. FIGS. 3A and 3B each depict examples of sub-graphs created based on sentences from the text-based knowledge corpus 110, according to certain aspects of the present disclosure. The sub-graph 300A shown in FIG. 3A is created based on a sentence from a marketing textbook chapter focusing on market segmentation: "Market segmentation involves dividing a market into smaller segments of buyers with distinct needs, characteristics, or behaviors that might require separate marketing strategies or mixes." In this sentence, the noun-phrases are "market segmentation," "market," "segments of buyers," "distinct needs," "characteristics," "behaviors," and "separate marketing strategies." The relations determined for pairs of these noun-phrases are "require," "arise from," "generate," etc. The relation classifier also determines that certain pairs of noun-phrases, such as the pair (distinct needs, behavior) and the pair (market, behavior), do not have relations.

The sub-graph 300A is created using the noun-phrases extracted from this sentence as the nodes or entities 302, 306 and using the relations between pairs of noun-phrases as the edges 304. Note that the relations are normally a one-way relation, such as market requires market segmentation. The sub-graph is thus a directed graph and the direction of the edge indicates the relation between the pair of nodes connected by the edge. For a directed edge representing a one-way relation, the entity represented by the starting node is also referred to herein as a "subject entity," and the entity represented by the ending node is also referred to herein as an "object entity." For instance, in the one-way relation ("market segmentation", "arises from", "behavior"), "market segmentation" is the subject entity and "behavior" is the object entity.

FIG. 3B shows a sub-graph 300B created based on a sentence extracted from the same portion of the knowledge corpora 110 as sub-graph 300A. The sentence used to create the sub-graph 300B is "Through market segmentation, companies divide large, heterogeneous markets into smaller segments that can be reached more efficiently and effectively with products and services that match their unique needs." Similar to 300A, the noun-phrases in this sentence, such as "market segmentation," "companies," "heterogeneous markets," "segments," "products," "services," and "unique needs," are represented using nodes of the sub-graph. Relations between the noun-phrases, such as "generate," "pave the way for," "used for," are represented by the edges of the sub-graph. Other sub-graphs can be created for other sentences in a way similar to sub-graphs 300A and 300B.

Although the above example describes building a sub-graph for each sentence of the knowledge corpora 110, a sub-graph can be built for multiple sentences. For example, the noun-phrases in multiple sentences can be extracted and the relations between pairs of the noun-phrases can be determined using a relation classifier trained to predict relations between pairs of noun-phrases based on the multiple sentences. Other ways of building a sub-graph based on multiple sentences can also be utilized.

Referring back to FIG. 2, at block 208, the process 200 involves merging the sub-graphs generated at block 206 to create a knowledge graph 116 for the topic. In some examples, the knowledge graph generation system 102 performs the merging by combining common nodes and edges in the sub-graphs 114 into a signal node or a single edge. FIG. 3C depicts an example of a knowledge graph created by merging sub-graphs shown in FIGS. 3A and 3B and other sub-graphs, according to certain aspects of the present disclosure.

To show the sub-graphs used to generate the knowledge graph 300C, edges from sub-graph 300A are shown in dashed lines and edges from sub-graph 300B are shown in solid lines. Edges from other sub-graphs are shown in dotted lines. As shown in FIG. 3C, node 302 in sub-graph 300A and node 312 in sub-graph 300B are common to both sub-graphs and are thus merged into a single node 322. Similarly, nodes 308 and 318 are merged into a signal node 328 in the knowledge graph 300C. The edge 310 in sub-graph 300A and the edge 320 in sub-graph 300B are common edges and thus are merged into a signal edge 330 in the knowledge graph 300C.

Returning to FIG. 2, at block 210, the process 200 involves receiving a knowledge request 140 for the knowledge graph 116 from a computing device, such as the host system 132 or the performance evaluation system 130. In some examples, the request may include a subject entity and a relation requesting to query the knowledge graph 116 for object entities that are related to the subject entity through the specified relation. The subject entity and the relation may be explicitly specified in the request or be parsed from a question contained in the request. In other examples, the request, or a question contained therein, may include a subject entity and an object entity to query the knowledge graph 116 for relations between the subject entity and the object entity. Other types of requests or queries may also be used to request knowledge from the knowledge graph 116.

At block 212, the knowledge graph generation system 102 queries or instructs another computing device to query the knowledge graph 116 based on the knowledge request 140. In examples where the knowledge request 140 requests object entities, the knowledge graph generation system 102 or another device traverses or otherwise queries the knowledge graph 116 to determine the object entities that satisfy the knowledge request 140. In examples where the knowledge request 140 requests relations between subject entities and object entities, the knowledge graph generation system 102 or another device queries the knowledge graph 116 to determine the relations that satisfy the knowledge request 140. The determined object entities, relations, or other query results may be returned to the requesting computing system. As discussed in detail with regard to FIG. 1, the query results can be utilized to determine actions for improving performance of a computing system, such as modifying a user interface of an online platform to improve the performance of the online platform. One mechanism for querying or analyzing the knowledge graph 116 is described in U.S. patent application Ser. No. 16/389,628, which was filed on Apr. 19, 2019, and entitled "Facilitating Changes to Online Computing Environment by Assessing Impacts Of Actions Using a Knowledge Base Representation," and which is expressly incorporated herein by reference in its entirety.

Figure 4:
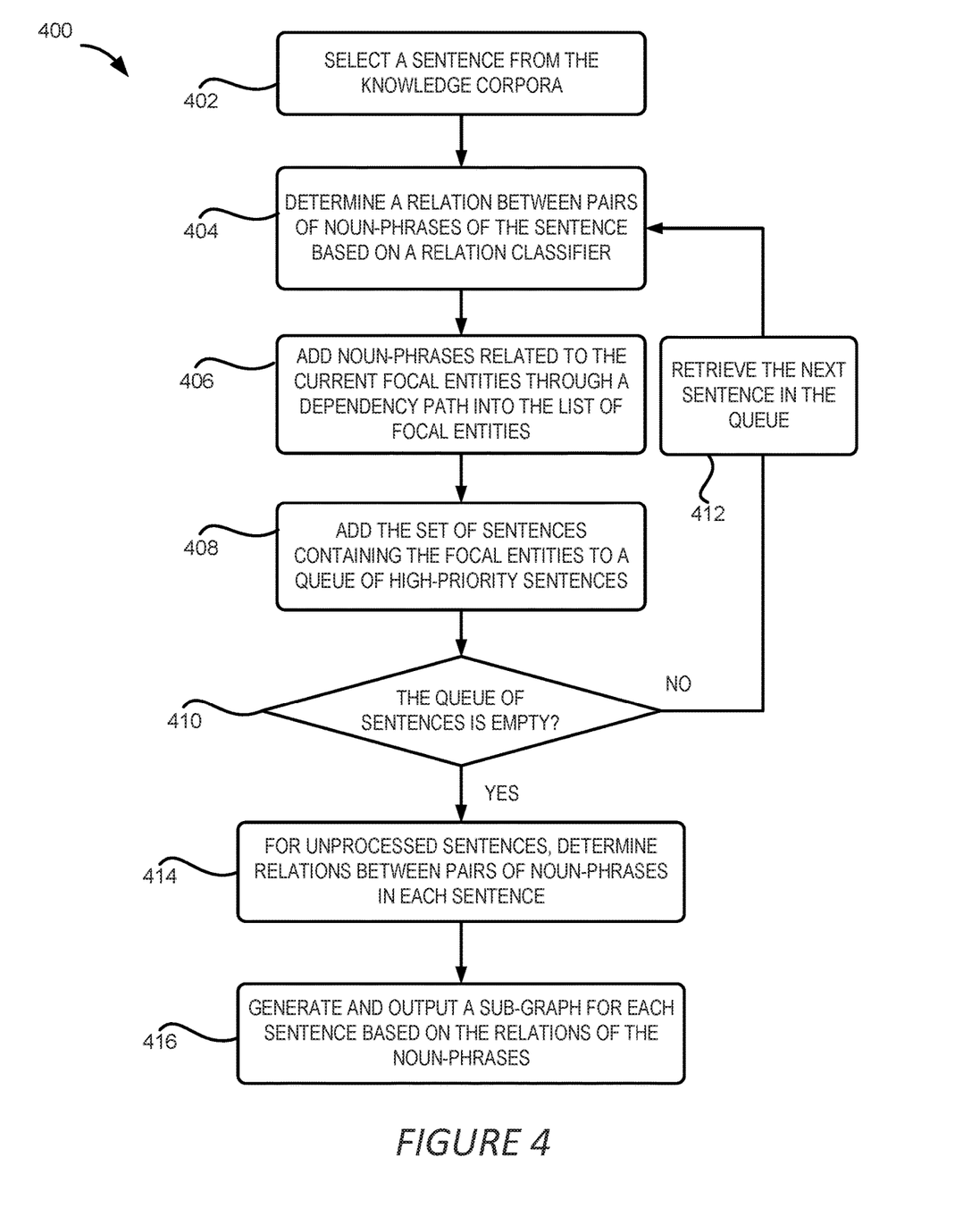
FIG. 4 depicts an example of a process for determining relations between noun-phrases in sentences of the knowledge corpus and for building sub-graphs for the sentences used by the process of FIG. 2, according to certain aspects of the present disclosure.

FIG. 4 depicts an example of process 400 for determining relations 124 between noun-phrases 122 in sentences 112 of the knowledge corpus 110 and for building sub-graphs 114 for the sentences 112, according to certain embodiments of the present disclosure. The process 400 can be used to implement block 206 of the process 200. One or more computing devices (e.g., the computing environment 100) implement operations depicted in FIG. 4 by executing suitable program code (e.g., the knowledge graph generation system 102). For illustrative purposes, the process 400 is described with reference to certain examples depicted in the figures. Other implementations, however, are possible.

At block 402, the process 400 involves selecting the first sentence from the sentences 112 extracted from the knowledge corpora 110. In some examples, the first sentence is selected to include a topic term, i.e., the term describing the topic for which the knowledge graph 116 is to be built. For example, in a well-structured book, the first sentence of the book chapter or the section dedicated for a topic (e.g., a booker chapter on market segmentation) typically includes the definition of the topic term (e.g., the definition of market segmentation) and thus can be selected as the first sentence by the knowledge graph generation system 102.

At block 404, the process 400 involves determining, using a relation classifier 104, a relation 124 between each pair of noun-phrases 122 of the sentence that is currently being evaluated. As discussed above with respect to FIGS. 1 and 2, in some examples, the relation classifier 104 is trained to receive an input that contains a pair of noun-phrases (a subject entity $n_s$ and an objective entity $n_o$) and the sentence x containing the pair, collectively referred to as a relation mention x={x, $n_s$, $n_o$}, and to generate an output r indicating a predicted relation between the pair of noun-phrases, where r∈R (a closed set of relations determined from the knowledge corpora 110). In one example, the relation classifier 104 is trained through semi-supervised training based on the classifier training dataset 118.

The training dataset 118 includes a set of labeled training data (i.e., labeled relation mentions) and a set of unlabeled training data (i.e., unlabeled relation mentions). In some examples, the classifier training dataset 118 is generated from the knowledge corpora 110 through extracting noun-phrases from sentences contained in the knowledge corpora 110. In some implementations, the noun-phrases pairs that are connected via a dependency path with a length more than a threshold number of words are eliminated from the pairs of noun-phrases. This process results in a set of unlabeled relation-mentions $U'=\{x_i\}_{i=1}^{N_L+N_U}$, where $N_L+N_U$ is the number of unlabeled relation-mentions in U'. A small set of relation-mentions is sampled from U' and labeled with a relation $y_i$ for each relation mention $x_i=\{x_i, n_{si}, n_{oi}\}$ by an expert with domain knowledge to create the set of labeled relation mentions $L=\{x_i,y_i\}_{i=1}^{N_L}$ and the set of unlabeled relation mentions $U=\{x_i\}_{i=1}^{N_U}$ In some examples, the entities $n_{si}, n_{oi}$ contain only text and are not attached with metadata or tags indicating information such as the type of the entities or other metadata.

Based on the labeled relation mentions L and the unlabeled relation mentions U, the knowledge graph generation system 102 employs semi-supervised training process to propagate the information contained in the labeled relation mentions L to the unlabeled relation mentions U which enables the relation classifier 104 to predict the relation for an input relation mention. More specifically, given a set of labeled relation-mentions $L=\{x_i,y_i\}_{i=1}^{N_L}$ and the set of unlabeled relation mentions $U=\{x_i\}_{i=1}^{N_U}$, the training task aims to learn a classification model f that represents the training data L and captures the information from the unlabeled data U.

The framework of the training process consists of a prediction module $P_\theta$ and a retrieval module $Q_\varphi$, where θ and φ are the model parameters. The prediction module's task is to represent f, i.e., predicting the relation given the relation-mention. It models the conditional probability $p_\theta(y|x)$ for a mention-label pair (x, y). Whereas, the retrieval module complements the prediction module by retrieving relevant sentences given a specific relation. Hence, it models $q_\varphi(x|y)$ for a mention-label pair. The overall objective function of the training process can be formulated as:

$$O = O_P + \lambda_R O_R + \lambda_U O_U,$$

$$O_P = E_{(x,y)\in L}[\log p_\theta(y|x)]$$

$$O_R = E_{(x,y)\in L}[\log q_\varphi(x,y)]$$

$$O_U = E_{x\in U}[\log p(x)]. \quad (1)$$

Here hyper-parameters $\lambda_R$, $\lambda_U$ are determined using a validation data set that is part of the training dataset 118, and the value of the $\lambda_R$, $\lambda_U$ can be different. $O_P$ can be approximated using cross-entropy loss between the ground truth label (i.e., the labeled relation contained in the labeled relation mentions L) and the predicted label (i.e., the predicted relation). The objective $O_R$ is approximated using:

$$E_{(x,y)\in L}[\log \sigma(z^T\gamma)] + E_{(x,y)\notin L}[\log(1-\sigma(z^T\gamma'))], \quad (2)$$

where (x, y) is a labeled pair in L, (x,y') is an incorrect relation pair with a relation mention x; z is mention encoding for x; γ and γ' are the embeddings of the relations y and y', respectively. σ represents the sigmoid activation function. The objective $O_U$ can be approximated using its lower bound:

$$O_U \geq E_{x\in U, y\sim p_\theta}(y|x)\left[\log \frac{q_\varphi(x,y)}{p_\theta(y|x)}\right]. \quad (3)$$

The knowledge graph generation system 102 follows an expectation-maximization approach to jointly optimize both the prediction module $P_\theta$ and the retrieval module $Q_\varphi$. In the expectation step, the prediction module $P_\theta$ is updated by fixing the retrieval module Q. This step corresponds to minimizing the KL divergence between $p_\theta$ and $q_\varphi$. In the maximization step, the retrieval module $Q_\varphi$ is updated by fixing the prediction module $P_\vartheta$. The gradient calculations for parameters θ and φ can be performed as follows:

$$\nabla_\theta(O) = E_{(x,y)\in L}[\nabla_\theta \log p_\theta(y|x)] + E_{x\in U, y\sim p_\theta(y|x)+q_\varphi(x,y)}$$
$$[\nabla_\theta \log p_\theta(y|x)],$$

$$\nabla_\varphi(O) = E_{(x,y)\in L}[\nabla_\varphi \log p_\varphi(y|x)] + E_{x\in U, y\sim p_\theta(y|x)+q_\varphi(x,y)}$$
$$[\nabla_\varphi \log p_\theta(y|x)]. \quad (4)$$

The relation classifier 104, which is trained through the above process, can be utilized by the knowledge graph generation system 102 to predict the relation between the pair of entities in an input relation mention x={x, $e_s$, $e_o$}.

In other implementations, the knowledge graph generation system 102 determines the relations between the noun-phrases of the current sentence and a list of focal entities. In other words, instead of determining the relations between an arbitrary pair of noun-phrases, the knowledge graph generation system 102 only examines the relations between the extracted noun-phrases and the focal entities. If the current sentence is the first sentence being evaluated, the list of focal entities only contains the topic term. As such, in these implementations, the knowledge graph generation system 102 is configured to determine the relation between the topic term and each of the extracted noun-phrases. As will be discussed later in the process 400, the knowledge graph generation system 102 adds more noun-phrases to the list of focal entities as more sentences are evaluated. As such, for any subsequent sentence, the knowledge graph generation system 102 is configured to determine the relations between the extracted noun-phrases and the focal entities.

This process allows the analysis to focus on important entities because typically the first sentence is a definition sentence which contains important noun-phrases (i.e., the focal entities). By focusing on the relations to the focal entities, the hierarchical structure starting from the topic term of the knowledge corpora 110 can be maintained and captured by the knowledge graph 116 without determining the relations between all pairs of noun-phrases. This also reduces the computational complexity of the knowledge graph generation process.

At block 406, the process 400 involves adding noun-phrases of the current sentence that are related to a focal entity to the list of focal entities. As discussed above, if the current sentence is the first sentence, the list of focal entities includes the topic term. The newly added focal entities include noun-phrases related to the topic term through a dependency path. To determine the dependency paths in a sentence, the knowledge graph generation system 102 parses the grammatical structure of the current sentence and determines the relations between noun-phrases mentioned in this sentence. If two noun-phrases are related according to the grammatical structure of the current sentence, there is a dependency path between these two noun-phrases. The dependency path of a sentence can be determined using any syntactic dependency parser known in the art.

At block 408, the process 400 involves determining a set of sentences containing at least one of the focal entities determined at block 406 and adding the set of sentences to a queue of high-priority sentences. Because the sentences in the queue of high-priority sentences each contain at least one focal entity, these sentences are processed with a higher priority than other sentences. At block 410, the process 400 involves determining if the queue of high-priority sentences is empty. If not, the knowledge graph generation system 102 retrieves the next sentence from the queue of high-priority sentences as the current sentence at block 412 and starts to process the sentence as discussed above at block 404.

If the queue of high-priority sentences is empty, at block 414, the process 400 involves processing the remaining unprocessed sentences. For each of these sentences, the knowledge graph generation system 102 determines the relations between pairs of noun-phrases extracted from the sentence using the relation classifier 104. In some examples, the pairs of noun-phrases include all the possible pairs of noun-phrases extracted from the current sentence. In further examples, the knowledge graph generation system 102 determines the dependency paths of the current sentence and removes the relations that contradict with the dependency paths of the sentence. For example, if the relation classifier 104 determines that a relation r exists between a subject entity $n_s$ and an object entity $n_o$, but there is no dependency path between the noun-phrases corresponding to $n_s$ and $n_o$, the knowledge graph generation system 102 removes the relation r and determines that there is no relation between $n_s$ and $n_o$.

This trimming process can help to remove relations that might be determined inaccurately by the relation classifier 104, thereby improving the overall accuracy of the knowledge graph 116. In some cases, such as if the relation classifier 104 has a high accuracy of predicting relations, this trimming process may be omitted. Similar trimming process can also be applied at block 404 when processing sentences in the queue of high-priority sentences.

At block 416, the process 400 involves generating a sub-graph 114 for each of the sentences in the knowledge corpora 110 based on the relations determined for the respective sentences. As discussed above with respect to FIG. 1, a sub-graph 114 can be generated by representing the noun-phrases extracted from the sentence as the nodes or entities and representing the relations as the edges. An entity might be a subject entity or an object entity depending on the direction of the relation.

Although the above description focuses on generating a knowledge graph 116 for a specific topic, a knowledge graph 116 for multiple topics can be built in a similar way. For example, one knowledge graph 116 can be built for each of the topics based on the knowledge corpora 110 covering the corresponding topic. These topic-specific knowledge graphs 116 can be merged to generate a comprehensive knowledge graph 116. Alternatively, the comprehensive knowledge graph 116 can be built by analyzing the knowledge corpora 110 altogether regardless of topics.

Example of a Computing System for Implementing Certain Embodiments

Figure 5:
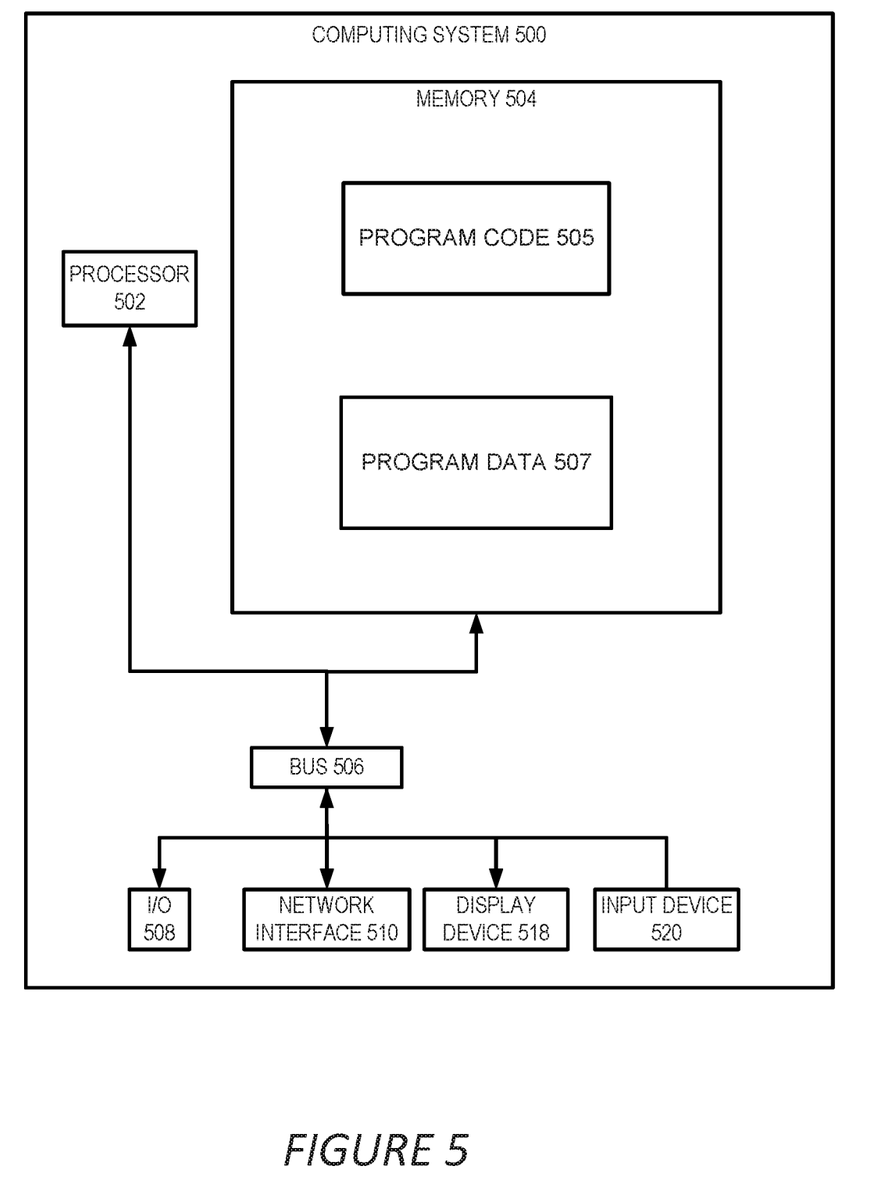
FIG. 5 depicts an example of a computing system for implementing certain aspects of the present disclosure.

Any suitable computing system or group of computing systems can be used for performing the operations described herein. For example, FIG. 5 depicts an example of the computing system 500. The implementation of computing system 500 could be used for one or more of a knowledge graph generation system 102, a host system 132 and a performance evaluation system 130. In other embodiments, a single computing system 500 having devices similar to those depicted in FIG. 5 (e.g., a processor, a memory, etc.) combines the one or more operations and data stores depicted as separate systems in FIG. 1.

The depicted example of a computing system 500 includes a processor 502 communicatively coupled to one or more memory devices 504. The processor 502 executes computer-executable program code stored in a memory device 504, accesses information stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices, including a single processing device.

A memory device 504 includes any suitable non-transitory computer-readable medium for storing program code 505, program data 507, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 500 executes program code 505 that configures the processor 502 to perform one or more of the operations described herein. Examples of the program code 505 include, in various embodiments, the knowledge graph generator 106, the relation classifier 104, the online platform 134, or other suitable applications that perform one or more operations described herein (e.g., one or more development applications for configuring the online platform 134). The program code may be resident in the memory device 504 or any suitable computer-readable medium and may be executed by the processor 502 or any other suitable processor.

In some embodiments, one or more memory devices 504 stores program data 507 that includes one or more datasets and models described herein. Examples of these datasets include interaction data, performance data, etc. In some embodiments, one or more of data sets, models, and functions are stored in the same memory device (e.g., one of the memory devices 504). In additional or alternative embodiments, one or more of the programs, data sets, models, and functions described herein are stored in different memory devices 504 accessible via a data network. One or more buses 506 are also included in the computing system 500. The buses 506 communicatively couples one or more components of a respective one of the computing system 500.

In some embodiments, the computing system 500 also includes a network interface device 510. The network interface device 510 includes any device or group of devices suitable for establishing a wired or wireless data connection to one or more data networks. Non-limiting examples of the network interface device 510 include an Ethernet network adapter, a modem, and/or the like. The computing system 500 is able to communicate with one or more other computing devices (e.g., a computing device executing a knowledge graph generation system 102) via a data network using the network interface device 510.

The computing system 500 may also include a number of external or internal devices, an input device 520, a presentation device 518, or other input or output devices. For example, the computing system 500 is shown with one or more input/output ("I/O") interfaces 508. An I/O interface 508 can receive input from input devices or provide output to output devices. An input device 520 can include any device or group of devices suitable for receiving visual, auditory, or other suitable input that controls or affects the operations of the processor 502. Non-limiting examples of the input device 520 include a touchscreen, a mouse, a keyboard, a microphone, a separate mobile computing device, etc. A presentation device 518 can include any device or group of devices suitable for providing visual, auditory, or other suitable sensory output. Non-limiting examples of the presentation device 518 include a touchscreen, a monitor, a speaker, a separate mobile computing device, etc.

Although FIG. 5 depicts the input device 520 and the presentation device 518 as being local to the computing device that executes the knowledge graph generation system 102, other implementations are possible. For instance, in some embodiments, one or more of the input device 520 and the presentation device 518 can include a remote client-computing device that communicates with the computing system 500 via the network interface device 510 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
extracting a plurality of sentences from a text-based knowledge corpus;
for each sentence of the plurality of sentences, determining relations between noun-phrases within the sentence based on dependency paths of the sentence and relations predicted by a relation classifier configured to predict a relation between a pair of noun-phrases within the sentence, wherein the relation classifier is trained based on training data through semi-supervised training, wherein the training data comprises (i) a set of labeled training data that comprises subject entities and object entities and relations between the subject entities and the object entities and (ii) a set of unlabeled training data that comprises subject entities and object entities;
generating a sub-graph for each sentence of the plurality of sentences based on (a) the noun-phrases in the sentence without using other types of phrases in the sentence and (b) the relations between the noun-phrases in the sentence, wherein the sub-graph comprises a plurality of entities representing the noun-phrases in the sentence and a plurality of edges connecting the plurality of entities, each edge of the plurality of edges representing the relation between two noun-phrases connected by the edge;

generating a knowledge graph by merging the sub-graphs for the plurality of sentences;

identifying one or more entities or one or more relations from the knowledge graph based on a knowledge request; and transmitting the one or more entities or one or more relations to an online platform, wherein the one or more entities or one or more relations are usable for modifying the online platform.

2. The method of claim 1, wherein the dependency paths of a sentence are determined based on a grammatical structure of the sentence.

3. The method of claim 2, wherein the text-based knowledge corpus is related to a topic and at least one of the plurality of sentences containing a topic term describing the topic.

4. The method of claim 3, further comprising:
determining a list of focal entities from a sentence containing the topic term by determining noun-phrases that are related to the topic term according to the dependency paths of the sentence; and
determining a set of high-priority sentences from the plurality of sentences, each sentence in the set of high-priority sentences containing at least one focal entity from the list of focal entities,
wherein determining relations between the noun-phrases for each sentence of the plurality of sentences comprises:
determining relations between the at least one focal entity and remaining noun-phrases in each sentence of the set of high-priority sentences, or
determining relations between the noun-phrases in each sentence of remaining sentences of the plurality of sentences.

5. The method of claim 2, further comprising updating the relations between noun-phrases of a sentence by removing relations that contradict with the dependency paths of the sentence, wherein a relation between two noun-phrases contradicts with the dependency paths of the sentence if the two noun-phrases are not related by any of the dependency paths.

6. The method of claim 1, wherein the subject entities and the object entities are free of metadata.

7. The method of claim 1, wherein merging the sub-graphs is performed by combining two or more overlapping entities of the sub-graphs into one entity.

8. A system comprising:
a memory device storing a text-based knowledge corpus; and
a knowledge graph generation system comprising:
one or more processing devices configured for performing operations comprising:
extracting a plurality of sentences from the text-based knowledge corpus;
for each sentence of the plurality of sentences, determining relations between noun-phrases within the sentence based, at least in part, upon dependency paths of the sentence and relations predicted by a relation classifier configured to predict a relation between a pair of noun-phrases within the sentence, wherein the relation classifier is trained based on training data through semi-supervised training, wherein the training data comprises (i) a set of labeled training data that comprises subject entities and object entities and relations between the subject entities and the object entities and (ii) a set of unlabeled training data that comprises subject entities and object entities;

generating a sub-graph for each sentence of the plurality of sentences based on (a) the noun-phrases in the sentence without using other types of phrases in the sentence and (b) the relations between the noun-phrases in the sentence, wherein the sub-graph comprises a plurality of entities representing the noun-phrases in the sentence and a plurality of edges connecting the plurality of entities, each edge of the plurality of edges representing the relation between two noun-phrases connected by the edge;

generating a knowledge graph by merging the sub-graphs for the plurality of sentences;

identifying one or more object entities from the knowledge graph in response to a query containing a subject entity and a relation; and a network interface device configured for transmitting the one or more object entities to an online platform, wherein the one or more object entities are usable for modifying the online platform.

9. The system of claim 8, wherein the subject entities and the object entities are free of metadata.

10. The system of claim 8, wherein the dependency paths of a sentence are determined based on a grammatical structure of the sentence.

11. The system of claim 10, wherein the text-based knowledge corpus is related to a topic and at least one of the plurality of sentences containing a topic term describing the topic.

12. The system of claim 11, wherein the operations further comprise:
determining a list of focal entities from a sentence containing the topic term by determining noun-phrases that are related to the topic term according to the dependency paths of the sentence; and
determining a set of high-priority sentences from the plurality of sentences, each sentence in the set of high-priority sentences containing at least one focal entity from the list of focal entities,
wherein determining relations between the noun-phrases for each sentence of the plurality of sentences comprises:
determining relations between the at least one focal entity and remaining noun-phrases in each sentence of the set of high-priority sentences, or
determining relations between the noun-phrases in each sentence of remaining sentences of the plurality of sentences.

13. The system of claim 10, the operations further comprise updating the relations between noun-phrases of a sentence by removing relations that contradict with the dependency paths of the sentence, wherein a relation between two noun-phrases contradicts with the dependency paths of the sentence if the two noun-phrases are not related by any of the dependency paths.

14. The system of claim 8, wherein merging the sub-graphs is performed by combining two or more overlapping entities of the sub-graphs into one entity.

15. A non-transitory computer-readable medium having program code that is stored thereon, the program code executable by one or more processing devices for performing operations comprising:
- extracting a plurality of sentences from a text-based knowledge corpus;
- for each sentence of the plurality of sentences, determining relations between noun-phrases within the sentence based, at least in part, upon dependency paths of the sentence and relations predicted by a relation classifier configured to predict a relation between a pair of noun-phrases within the sentence, wherein the relation classifier is trained based on training data through semi-supervised training, wherein the training data comprises (i) a set of labeled training data that comprises subject entities and object entities and relations between the subject entities and the object entities and (ii) a set of unlabeled training data that comprises subject entities and object entities;
- generating a sub-graph for each sentence of the plurality of sentences based on (a) the noun-phrases in the sentence without using other types of phrases in the sentence and (b) the relations between the noun-phrases in the sentence, wherein the sub-graph comprises a plurality of entities representing the noun-phrases in the sentence and a plurality of edges connecting the plurality of entities, each edge of the plurality of edges representing the relation between two noun-phrases connected by the edge;
- generating a knowledge graph by merging the sub-graphs for the plurality of sentences;
- identifying one or more relations from the knowledge graph in response to a query containing at least a subject entity and an object entity; and
- causing the one or more relations to be transmitted to an online platform, wherein the one or more relations are usable for modifying the online platform.

16. The non-transitory computer-readable medium of claim 15, wherein merging the sub-graphs is performed by combining two or more overlapping entities of the sub-graphs into one entity.

17. The non-transitory computer-readable medium of claim 15, wherein the subject entities and the object entities are free of metadata.

18. The non-transitory computer-readable medium of claim 15, wherein the operations further comprise updating the relations between noun-phrases of a sentence by removing relations that contradict with the dependency paths of the sentence, wherein a relation between two noun-phrases contradicts with the dependency paths of the sentence if the two noun-phrases are not related by any of the dependency paths, wherein the dependency paths of the sentence are determined based on a grammatical structure of the sentence.

* * * * *